Patented Feb. 15, 1949

2,461,922

UNITED STATES PATENT OFFICE 2,461,922

ANTIBIOTIC EXTRACTION FROM SOLIDS OF ACTINOMYCES GRISEUS CULTURE

Geoffrey W. Rake, Milltown, and Walter L. Koerber, Kingston, N. J., and Richard Donovick, New York, N. Y., assignors to E. R. Squibb & Sons, New York, N. Y., a corporation of New York No Drawing. Application April 5, 1945, Serial No. 586,824

11 Claims. (Cl. 195—80)

This invention relates to antibiotic substances.

Prior to this invention, it had been shown: (1) that a potent antibiotic substance called streptomycin is present in the culture liquid obtained when the organism *Actinomyces griseus* is grown in or on certain liquid media (Schatz, Bugie, and Waksman, Proc. Soc. Exp. Biol. and Med., 1944, 55, 66); and (2) that a second, ether-soluble, antibiotic factor is present largely in the mycelium of the organism (Schatz and Waksman, Proc. Soc. Exp. Biol. and Med., 1944, 57, 244).

We have found that the solids (the mycelia, spores, and other sedimentable solids) of a culture of *Actinomyces griseus* that has produced streptomycin contain a highly-active, streptomycin-like antibiotic substance (or substances) insoluble in ether (at pH 2.0 or pH 8.8).

It is the object of this invention to provide this highly-active, streptomycin-like, ether-insoluble antibiotic substance, and methods of obtaining it; and it is a further object to provide methods of enhancing the antibiotic activity of streptomycin-containing culture liquids.

The methods of this invention essentially comprise subjecting the solids of a culture of *Actinomyces griseus* that has produced streptomycin to extraction with an aqueous acid, and recovering the antibiotic substance in the extract. [By "culture of *Actinomyces griseus* that has produced streptomycin" is meant, of course, the culture obtained by growing *Actinomyces griseus* under conditions and in a medium suitable for the production of streptomycin.] The extraction of the solids may be effected either while they are still in the culture or after their separation from the culture liquid, or at both stages.

Thus, the extraction may be effected by acidifying the (whole) culture, preferably after substantially-maximum streptomycin production has been attained, and intimately contacting the solid and liquid components of the culture. In this case, the antibiotic substance in the solids is extracted into the streptomycin-containing liquid; and, on separation of the solids, a streptomycin-containing culture liquid (A) of exhanced activity is obtained. Alternatively, the solids are first separated from the culture liquid, as by centrifugation or filtration, in which case the supernate or filtrate (B) corresponds to the streptomycin-containing culture liquid obtained prior to this invention; and the separated solids are then extracted with an aqueous acid; and from this extract ($B_1$), a highly-active antibiotic substance may be obtained. As a further alternative, the solids are first extracted while they are still in the culture, then separated from the (enhanced-activity) culture liquid (A), and the separated solids then treated with an aqueous acid to obtain an extract ($A_1$) containing a highly-active antibiotic substance. The preparations A, $B_1$, and $A_1$, as well as preparation B, may be used or further treated as a streptomycin-containing culture liquid, e. g., treated to obtain streptomycin and/or a highly-active, streptomycin-like, ether-insoluble antibiotic in highly-purified or substantially-pure form.

The nature of the acid employed does not have a qualitative effect on the extraction, inorganic acids (inter alia, hydrochloric acid and sulfuric acid) and organic acids (e. g., citric acid) being utilizable; however, citric and sulfuric acids (and especially the latter) are preferred because they facilitate filtration of the extracts. Also, the acid-extraction of the antibiotic substance may be effected at various pH levels, extraction at a pH of 5.6 or 1.1, for example, being fully operative. In general, the activity of the extract increases as the pH is decreased. extraction at a pH of about 1 to 3 (especially at a pH of about 1.5–2) being preferred.

The time required for extraction of the antibiotic substance from the solids is dependent on the temperature of the extraction; i. e., in general, the higher the temperature, the less the time required. Thus, the activity obtained by extraction at 50° C. for one hour is almost twice that obtained by extraction at room temperature for 18 hours. A short extraction (say about ½ to 3 hours) at a relatively high temperature (say about 45 to 55° C.) is preferred from the standpoint of yield of antibiotic substance.

The following examples are illustrative of the invention (the potency unit referred to being derived from that amount of streptomycin required to inhibit completely the multiplication of 500–1000 cells of *K. pneumoniae* growing under standardized conditions in a culture medium containing 1% tryptone):

Example 1

(a) 400 gal. of an aqueous medium containing 1.5% soybean meal, 1.0% dextrose, 0.5% meat extract, and 0.5% sodium chloride in a 1300 gal. tank is inoculated with spores of *Actinomyces griseus*, and the medium is incubated at 25° C. under a pressure of 10–15 lbs. (air being passed through the medium) while stirring (at a rate of 130 R. P. M.)

(b) After 120 hours incubation, the culture (which has a pH of 7.0 and a potency of 120 units/ml.) is adjusted to pH 3.5 by adding 37% hydrochloric acid, and the acidified culture is agitated for another 48 hours at 5° C. (without aeration). The culture (whose potency is raised by this treatment to 173.5 units/ml.) is centrifuged; and the supernate (I) is used or further treated as a streptomycin-containing culture liquid.

Example 2

(a) The sediment (mycelium, spores, and other solids in the medium) collected in Example 1 (b) is washed twice with distilled water by centrifugation. The washed solids are then extracted with N/10 hydrochloric acid (which has been adjusted to pH 2.0 with sodium hydroxide) by shaking the mixture for 16 hours at room temperature (24° C.); and the extract (II) is separated by centrifugation. This extraction recovers 20 units of activity per mg. of the dry solids (dried at 100° C.); and a further extraction of the solids under the same conditions (extract III) recovers an additional 5 units per mg. dried solids. These extracts (II and III) may be used or further treated as streptomycin-containing culture liquids, or they may be combined with the supernate (I) obtained from the same culture (cf. Example 1b) for use or further treatment as a streptomycin-containing culture liquid; or these liquids may be treated (either separately or together) by the process described in Wintersteiner and Fried application, Serial No. 590,974, filed April 28, 1945, now abandoned to obtain a streptomycin-like preparation in highly-purified or substantially-pure form. This purification process is outlined in the following section.

(b) An extract such as II obtained in the foregoing section is neutralized, and the streptomycin-like antibiotic substance therein is purified by: (1) treating the neutralized extract with an activated charcoal, which selectively adsorbs the antibiotic; (2) eluting the antibiotic from the charcoal with dilute hydrochloric acid at about 70° C.; (3) treating the eluate with phosphotungstic acid; and (4) fractionally decomposing the precipitated phosphotungstate with barium hydroxide. The thus-obtained solution of partially-purified streptomycin-like antibiotic substance (or the solid obtained therefrom by freeze-drying) may be used as a chemotherapeutic agent without further purification, or may be further purified as outlined hereinafter. Using an extract having a potency of 220 units/ml., a freeze-dried product having a potency of 345 units/mg. may be obtained.

This partially purified product may be further purified by: (1) reacting it with picric acid in aqueous solution; (2) dissolving the resulting picrate in acetone; (3) passing the solution through an activated-alumina chromatographic adsorption column; (4) eluting the antibiotic-rich sections of the chromatogram with aqueous acetone; (5) decomposing the eluate with sulfuric acid; and (6) separating the acetone and picric acid from the sulfate of the antibiotic formed. A highly-purified sulfate of the streptomycin-like antibiotic substance having a potency of 490 units/mg. may thus be obtained; it may be used as—or converted into the free base for use as—a chemotherapeutic agent without further purification, or may be further purified as outlined hereinafter.

From this highly-purified sulfate of the antibiotic, a crystalline derivative may be obtained by reacting with a Reinecke salt in aqueous solution, and recovering the pure, crystalline Reineckate (clusters of fine leaflets, having a potency of 240 units/mg., and decomposing at 159–161° C. uncorrected). An analysis of the crystalline Reineckate (after drying in vacuo at 70° C. for 2 hours) reveals 27.09% carbon, 4.65% hydrogen, 21.43% nitrogen, 20.82% sulfur, and 8.53% chromium.

From this pure, crystalline Reineckate, the substantially-pure base and derivatives of the streptomycin-like antibiotic substance may be obtained by: (1) decomposing the Reineckate with silver sulfate in aqueous solution; (2) removing the precipitated silver Reineckate; and (3) recovering the resulting substantially-pure sulfate of the streptomycin-like antibiotic substance. The thus-obtained substantially-pure sulfate may be used as a chemotherapeutic agent, or may be converted into the substantially-pure free base for use as a chemotherapeutic agent, or may be converted into various other substantially-pure derivatives of the streptomycin-like antibiotic substance.

Example 3

(a) 400 gal. of an aqueous medium containing 1.5% soybean meal, 1.0% dextrose, and 0.5% sodium chloride in a 1300 gal. tank is inoculated with a mixture of spores and mycelium of *Actinomyces griseus*, and the inoculated medium is incubated at 25° C. under a pressure of 10–15 lbs. (air being passed through the medium) while stirring (at a rate of 130 R. P. M.).

(b) After 100 hours incubation, a 100 ml. portion of the culture (which has a potency of 27.6 units/ml.) is adjusted to pH 3.5 by adding 37% hydrochloric acid, and the acidified culture is stirred for 24 hours at 4° C. The culture (whose potency is raised by this treatment to 38.6 units/ml.) is centrifuged; and the supernate is used or further treated as a streptomycin-containing culture liquid.

Example 4

(a) The culture described in Example 3 (a), after incubation for 100 hours and removal of the 100 ml. portion referred to in section (b) of Example 3, is centrifuged. [The supernate is used or further treated as a streptomycin-containing culture liquid.] The sediment is collected and washed with two 1-liter portions of distilled water by centrifugation. [These washings have a potency of less than 4.5 units/ml., and may therefore be discarded.] To the washed sediment is added 1 liter distilled water, and the mixture is stirred to form homogeneous heavy slurry containing about 3.7 mg. solids per ml.

(b) A 100 ml. portion of the slurry obtained in the foregoing section is adjusted to pH 2.08 by adding 5N hydrochloric acid, and the mixture is shaken at room temperature (24° C.) for about 16 hours (the pH then being 2.4). The mixture is then centrifuged to obtain a sediment and a supernate (whose potency is 88 units/ml.); and the supernate is used or further treated as a streptomycin-containing culture liquid.

[Under otherwise identical conditions, extractions at pH's of 5.0–5.4, 3.1–3.9, and 1.1–1.22 yield supernates (extracts) of 35–59, 67, and 72 units/ml., respectively.]

(c) The sediment obtained in the foregoing section is resuspended in sufficient distilled water to return its volume to 100 ml.; and the suspension is adjusted to pH 2.55 by adding 5N hydrochloric acid, and shaken for 16 hours at room temperature. The supernate obtained on centrifugation has a potency of 35.5 units/ml., and may be combined with the extract obtained in the foregoing section, or used or further treated as a streptomycin-containing culture liquid. The combined extracts have a total activity of 6,175 units, representing a recovery of 33.1 units per mg. dried solids extracted.

[The second extraction may also be effected at pH 5.62 or 1.88, in which cases the supernates (extracts) have potencies of 15.2 and 23.9 units/ml., respectively.]

Example 5

A 75 ml. portion of the slurry obtained in Example 4 (a) is adjusted to pH 2 with 5N hydrochloric acid, and the mixture is stirred at 50° C. for an hour. The mixture is then centrifuged; and the supernate, whose potency is 98.5 units/ml. (representing a recovery of 26.5 units per mg. of the dried solids) is used or further treated as a streptomycin-containing culture liquid.

[Under otherwise identical conditions, extraction for 18 hours at 4° C. and 37° C. yield supernates (extracts) of 31.0 and 41.4 units/ml., respectively.]

Example 6

A 50 ml. portion of the slurry obtained in Example 4 (a) is adjusted to pH 2.15 with 5N sulfuric acid, and the mixture is stirred at 50° C. for an hour. The mixture is then centrifuged; and the clear supernate (extract), whose potency is 96.2 units/ml. (representing a recovery of 25.8 units per mg. of the dried solids) is used or further treated as a streptomycin-containing culture liquid.

[Under otherwise identical conditions, but using 40% citric acid in place of 5N sulfuric acid, the extraction yields a supernate having a potency of 93.6 units/ml.]

Example 7

(a) 800 gal. of an aqueous medium containing 1.5% soybean meal, 1.0% dextrose, 0.25% meat extract, and 0.5% sodium chloride in a 1300 gal. tank is inoculated with a mixture of spores and mycelium of *Actinomyces griseus*; and the inoculated medium is incubated at 25° C. under a pressure of 10–15 lbs. (air being passed through the medium) while stirring (at 130 R. P. M.)

(b) After 120 hours incubation, the culture (which has a potency of 55 units/ml.) is adjusted to pH 1.5 by adding 100% sulfuric acid; 4% Celite (a diatomaceous-earth filter-aid) and 1% Nuchar (an activated charcoal) are added; and the mixture is agitated for one-half to one hour at room temperature. The culture (whose potency is raised by this treatment about 60 to 70%) is centrifuged; and the supernate is used or further treated as a streptomycin-containing culture liquid.

When extracting with hydrochloric acid at a pH below 3, the supernate (extract) obtained may be extremely turbid; in such case, the extract may be clarified by adjusting its pH to about 3.5 by adding 5N sodium hydroxide, and filtering off the resulting heavy, flocculent precipitate (presumably soy-bean proteins).

It is to be understood that the streptomycin-like substance herein mentioned may in fact be streptomycin or a form thereof.

The invention may be variously otherwise embodied within the scope of the appended claims.

We claim:

1. The method of producing an antibiotic substance comprising culturing *Actinomyces griseus* to produce streptomycin, subjecting the solids of the culture to extraction with an aqueous acid, and recovering the antibiotic substance in the extract.

2. The method of producing an antibiotic substance comprising culturing *Actinomyces griseus* to produce streptomycin, acidifying the culture, intimately contacting the solid and liquid components of the culture, separating the solids from the culture liquid, and recovering an antibiotic substance from the culture liquid.

3. The method of producing an antibiotic substance comprising culturing *Actinomyces griseus* to produce streptomycin, separating the solids from the culture, subjecting the solids to extraction with an aqueous acid, and recovering the antibiotic substance in the extract.

4. The method of producing an antibiotic substance comprising culturing *Actinomyces griseus* to produce streptomycin, subjecting the solids of the culture to extraction with aqueous sulfuric acid, and recovering the antibiotic substance in the extract.

5. The method of prodcing an antibiotic substance comprising culturing *Actinomyces griseus* to produce streptomycin, subjecting the solids of the culture to extraction with water acidified to a pH of about 1 to 3, and recovering the antibiotic substance in the extract.

6. The method of producing an antibiotic substance comprising culturing *Actinomyces griseus* to produce streptomycin, subjecting the solids of the culture to extraction with an aqueous acid at a temperature of about 45 to 55° C., and recovering the antibiotic substance in the extract.

7. The method of producing an antibiotic substance comprising culturing *Actinomyces griseus* to produce streptomycin, subjecting the solids of the culture to extraction with an aqueous acid at a temperature of about 45 to 55° C. for a period of about ½ to 3 hours, and recovering the antibiotic substance in the extract.

8. The method of producing an antibiotic substance comprising culturing *Actinomyces griseus* to produce streptomycin, subjecting the solids of the culture to extraction with water acidified to a pH of about 1.5 to 2, and recovering the antibiotic substance in the extract.

9. The method of producing an antibiotic substance comprising culturing *Actinomyces griseus* to produce streptomycin, subjecting the solids of the culture to extraction with water acidified with sulfuric acid to a pH of about 1.5 to 2, and recovering the antibiotic substance in the extract.

10. The method of producing an antibiotic substance comprising culturing *Actinomyces griseus* to produce streptomycin, separating the solids from the culture, washing the solids with water, subjecting the washed solids to extraction with an aqueous acid, and recovering the antibiotic substance in the extract.

11. The method of producing an antibiotic substance comprising culturing *Actinomyces griseus* to produce streptomycin, intimately contacting the solids of the culture with an aqueous acid, separating the solids from the aqueous acid, and recovering an antibiotic substance from the aqueous acid.

GEOFFREY W. RAKE.
WALTER L. KOERBER.
RICHARD DONOVICK.

REFERENCES CITED

The following references are of record in the file of this patent:

Waksman et al., Proc. Soc. Exp. 't' 1. Biol. Med. vol. 49, pages 207–210 (1942), 260/236.5–C.

Schatz et al., Proc. Soc. Exp. Biol. and Med. 1944, vol. 55, page 66.

Schatz et al., Proc. Soc. Exp. Biol. and Med. 1944, vol. 57, page 244.